(12) United States Patent
Solihin

(10) Patent No.: US 9,391,927 B2
(45) Date of Patent: Jul. 12, 2016

(54) HETEROGENEOUS ROUTER CLOCK ASSIGNMENT AND PACKET ROUTING

(71) Applicant: Empire Technology Development LLC, Wilmington, DE (US)

(72) Inventor: Yan Solihin, Raleigh, NC (US)

(73) Assignee: Empire Technology Development LLC, Wilmington, DE (US)

( * ) Notice: Subject to any disclaimer, the term of this patent is extended or adjusted under 35 U.S.C. 154(b) by 455 days.

(21) Appl. No.: 13/995,411

(22) PCT Filed: Mar. 20, 2013

(86) PCT No.: PCT/US2013/033130
§ 371 (c)(1),
(2) Date: Jun. 18, 2013

(87) PCT Pub. No.: WO2014/149041
PCT Pub. Date: Sep. 25, 2014

(65) Prior Publication Data
US 2014/0286191 A1    Sep. 25, 2014

(51) Int. Cl.
*H04L 12/931* (2013.01)
*H04L 12/933* (2013.01)
*H04L 12/24* (2006.01)

(52) U.S. Cl.
CPC .............. *H04L 49/40* (2013.01); *H04L 49/109* (2013.01); *H04L 41/0893* (2013.01)

(58) Field of Classification Search
CPC ... G06F 1/3206; G06F 1/3293; G06F 9/5094; H04L 5/26; H04L 27/16; H04L 41/0893; H04L 45/24; H04L 45/025; H04L 45/58; H04L 45/304; H04L 47/30; H04L 47/39; H04L 49/40; H04L 49/109; Y02B 60/142
See application file for complete search history.

(56) References Cited

U.S. PATENT DOCUMENTS

| | | | | |
|---|---|---|---|---|
| 2005/0262370 | A1* | 11/2005 | Tsui | G06F 1/3203 713/375 |
| 2009/0245159 | A1* | 10/2009 | Oyman | H04B 7/2606 370/315 |
| 2010/0303026 | A1* | 12/2010 | Chaudhri | H04W 16/14 370/329 |
| 2011/0235531 | A1 | 9/2011 | Vangal et al. | |
| 2012/0198207 | A1 | 8/2012 | George et al. | |

OTHER PUBLICATIONS

Borkar, S. and Chien, A.A., "The future of microprocessors," Communications of the ACM Magazine, vol. 54, Issue 5, pp. 67-77, May 2011.

International Search Report and Written Opinion for International Patent Application No. PCT/US2013/033130 mailed May 6, 2013, 9 pages.

(Continued)

*Primary Examiner* — Alpus H Hsu
*Assistant Examiner* — Dharmesh Patel
(74) *Attorney, Agent, or Firm* — Moritt Hock & Hamroff LLP; Steven S. Rubin, Esq.

(57) ABSTRACT

Technologies generally described herein relate to systems and methods effective to control an operating frequency of routers in a multicore processor. Heterogeneous routers in a multicore processor with different maximum operating frequencies may be clustered together to form groups of routers with homogenous assigned operating frequencies. The groups may be used to identify paths to send packets from a first router to a second router along one or more paths.

22 Claims, 7 Drawing Sheets

(56) References Cited

OTHER PUBLICATIONS

Mishra A. K. et al., "A case for dynamic frequency tuning in on-chip networks," Proceedings of the 42nd Annual IEEE/ACM International Symposium on Microarchitecture, pp. 292-303, 2009.

Mishra, A.K. et al., "RAFT: A router architecture with frequency tuning for on-chip networks," Journal of Parallel and Distributed Computing, vol. 71, Issue 5, pp. 625-640, May 2011.

Ogras, U.Y. et al., "Variation-adaptive feedback control for networks-on-chip with multiple clock domains," 45th ACM/IEEE Design Automation Conference, DAC 2008, pp. 614-619, Jun. 8-13, 2008.

Samih, A. et al., "Energy-efficient interconnect via Router Parking," 19th International Symposium on High Performance Computer Architecture (HPCA2013), pp. 508-519, Feb. 23-27, 2013.

Sharifi, A. and Kandemir, M., "Process variation-aware routing in NoC based multicores," 48th ACM/EDAC/IEEE Design Automation Conference (DAC), pp. 924-929, Jun. 5-9, 2011.

Nicopoulos, C. et al.,"On the effects of process variation in network-on-chip architectures," IEEE Transactions on Dependable and Secure Computing, vol. 7, Issue 3, pp. 240-254, 2010.

Markovsky, Y. et al., "Using adaptive routing to compensate for performance heterogeneity," International Symposium on Networks-on-Chip, pp. 12-21, 2009.

\* cited by examiner

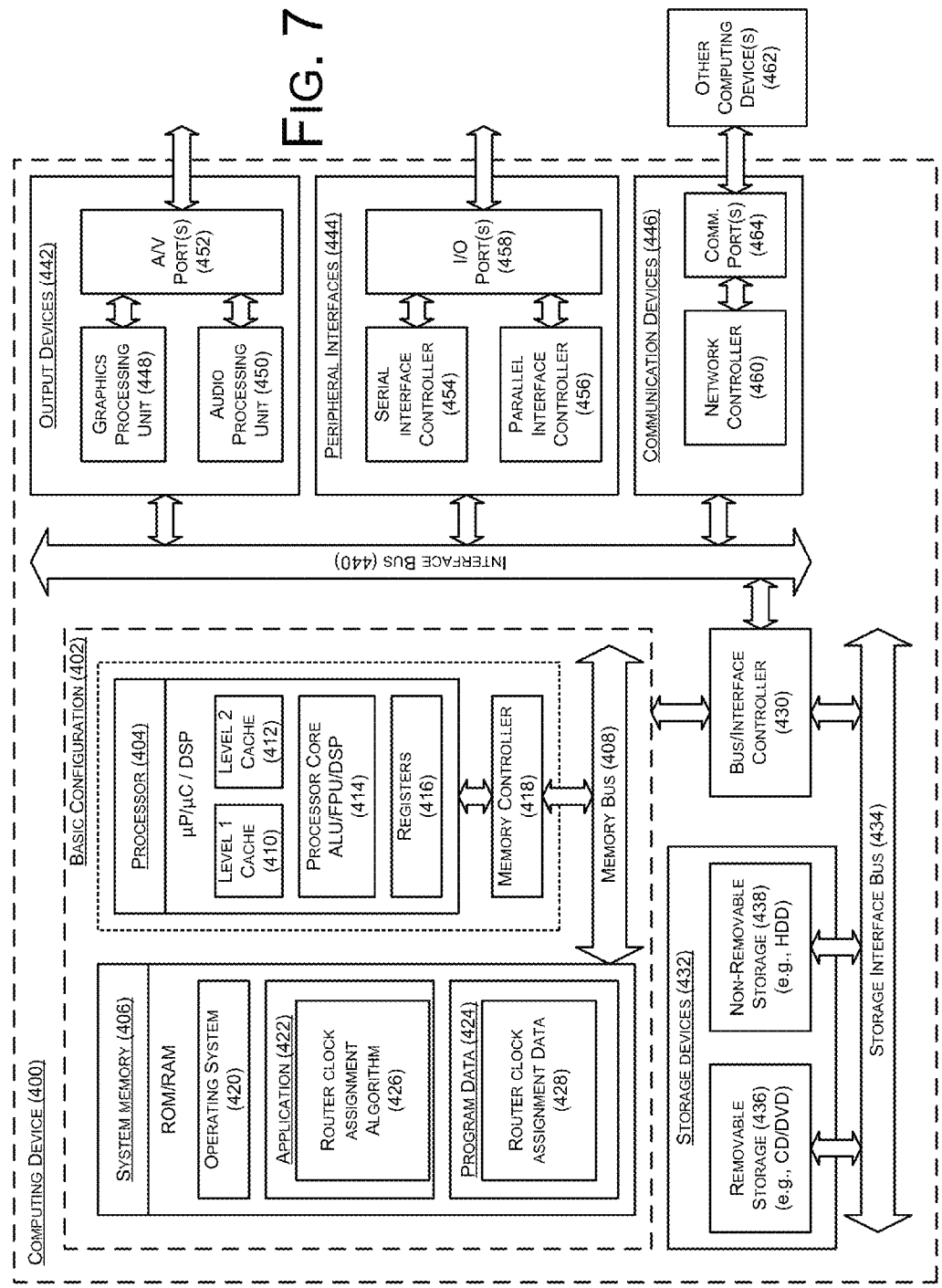

US 9,391,927 B2

HETEROGENEOUS ROUTER CLOCK ASSIGNMENT AND PACKET ROUTING

CROSS REFERENCE TO RELATED APPLICATION

This application is a U.S. National Stage filing under 35 U.S.C. §371 of International Application No. PCT/US2013/033130 filed Mar. 20, 2013. The disclosure of the International Application is hereby incorporated by reference in its entirety.

BACKGROUND

Unless otherwise indicated herein, the materials described in this section are not prior art to the claims in this application and are not admitted to be prior art by inclusion in this section.

In multicore processor architectures, multiple processor cores may be included in a single integrated circuit die or on multiple integrated circuit dies that are arranged in a single chip package. A cache may be used to store data for access by one or more of the processor cores. The data can be a subset of data stored in a larger memory that is typically located outside of the die. Each processor may be provided with a cache that stores data for the processor. A router may facilitate communication of packets from one core to another core.

SUMMARY

In some examples, methods for identifying groups of routers among tiles in a multicore processor are generally described. The methods may include selecting each router of the multicore processor. The methods may further include identifying a maximum operating frequency associated with each of the selected routers. The methods may include identifying each router within a hop distance of one from the selected router. The methods may include clustering one or more of the selected routers into a group of routers such that each router in the group has the same assigned operating frequency based on the maximum operating frequencies of the routers in the group. The methods may further include storing each group of routers in a memory with the corresponding assigned operating frequency. The storing of each group of routers may be such that operation of the multicore processor utilizes the stored groups of routers to identify a path between routers with a particular group of the routers with an assigned operating frequency that is less than the maximum operating frequency of one of the routers in the particular group.

In some examples, methods for identifying groups of routers among tiles in a multicore processor are generally described. The methods may include building a graph of nodes. Each node in the graph may correspond to a router in the multicore processor. The methods may include selecting each node in the graph. The methods may include identifying a maximum operating frequency associated with each selected node. The methods may include identifying each node within a hop distance of one from the selected node. The methods may include clustering one or more of the nodes into a group such that each node in the group has the same assigned operating frequency based on the maximum operating frequencies of the routers in the group. The methods may further include storing each group in a memory with the corresponding assigned operating frequency. The storing of each group may be such that operation of the multicore processor utilizes the stored sets of nodes to identify a path between routers with a particular group of nodes with an assigned operating frequency that is less than the maximum operating frequency of one of the nodes in the particular group.

In some examples, systems effective to control an operating frequency of routers in a multicore processor are generally described. The systems may include a multicore processor, a memory and a processor. The multicore processor may include two or more tiles. Each tile may include at least one router. At least a first router in the die may have a maximum operating frequency different from a second router. The processor may be configured to be in communication with the multicore processor and the memory. The processor may be effective to select each router of the multicore processor. The processor may be effective to identify a maximum operating frequency associated with each of the selected routers. The processor may be effective to identify each router within a hop distance of one from the selected router. The processor may be effective to cluster one or more of the routers into a group of routers such that each router in the group has the same assigned operating frequency based on the maximum operating frequencies of the routers in the group. The processor may be effective to store each group of routers in the memory with the corresponding assigned operating frequency. The storage of each group of routers may be such that operation of the multicore processor utilizes the stored groups of routers to identify paths between routers, and where a particular group of routers has an assigned operating frequency that is less than the maximum operating frequency of one of the routers in the particular group.

In some examples, methods of selecting a path between a first router and a second router are generally described. The methods may include identifying groups of routers stored in a memory. Each router may have a maximum operating frequency. Each group may have the same assigned operating frequency. A particular group may have an assigned operating frequency that is less than the maximum operating frequency of one of the paths in the particular group. The methods may include determining, using groups of routers, respective costs to send data from a first router to a second router, along one or more paths between the first router and the second router. The methods may further include, based on the determined respective costs, selecting a path between the first router and the second router to send a packet from the first router to the second router. Selection of the path may include identification of one or more routers from one of the groups and selection of the frequency assigned to the one of the groups as the operating frequency for the path.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 7 is a block diagram illustrating an example computing device that is arranged to implement heterogeneous router clock assignment and packet routing in a multicore architecture, all arranged according to at least some embodiments described herein.

DETAILED DESCRIPTION

Figure 1:
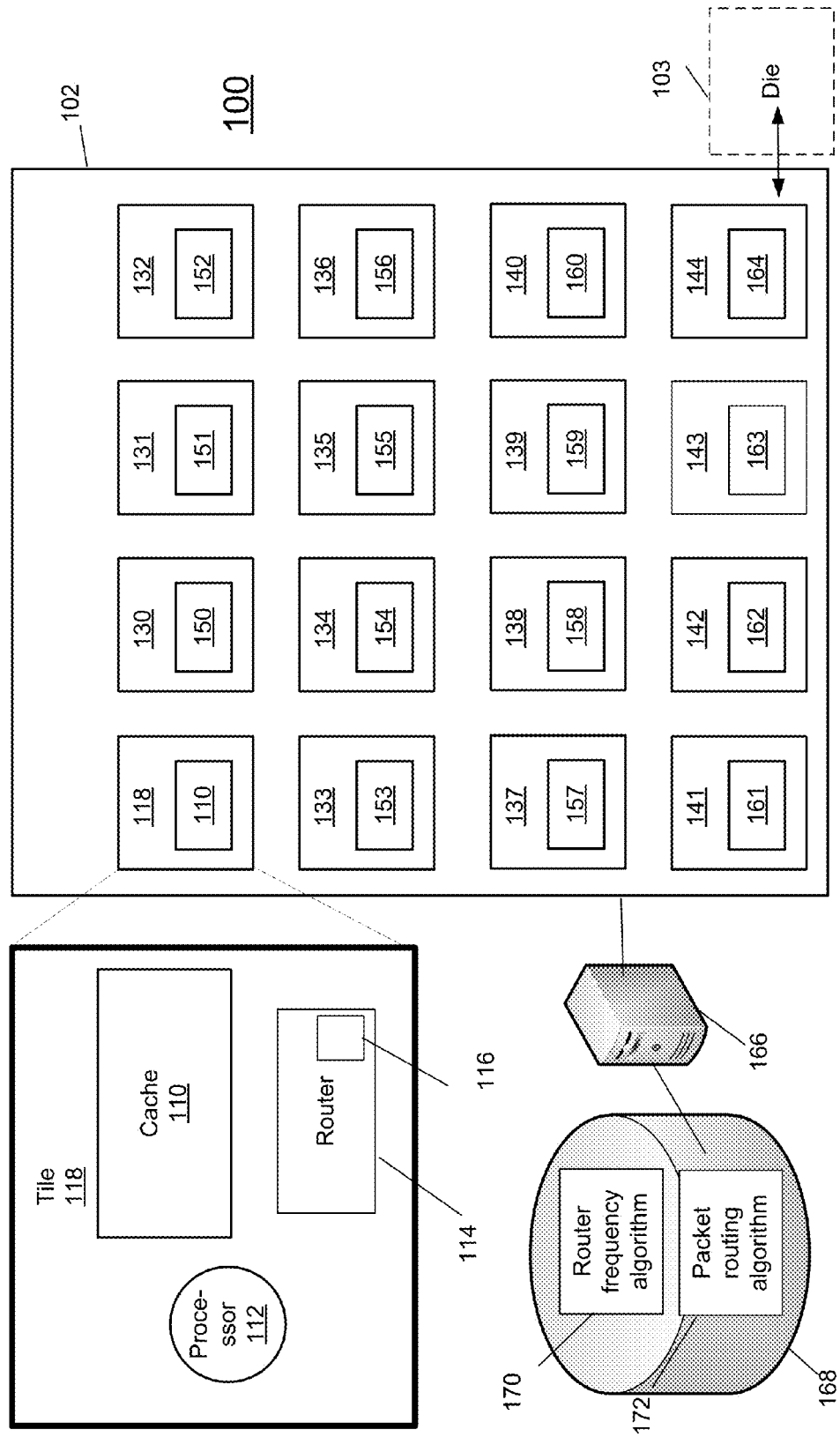
FIG. 1 illustrates an example system that can be utilized to implement heterogeneous router clock assignment and packet routing in a multicore architecture.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and computer program products related to heterogeneous router clock assignment and packet routing in a multicore architecture.

Briefly stated, technologies are generally described for systems and methods effective to control an operating frequency of routers in a multicore processor. Heterogeneous routers in a multicore processor with different maximum operating frequencies may be clustered together to form groups of routers with homogenous assigned operating frequencies. The groups may be used to identify paths to send packets from a first router to a second router along one or more paths.

FIG. 1 illustrates an example system that can be utilized to implement heterogeneous router clock assignment and packet routing in a multicore architecture arranged in accordance with at least some embodiments described herein. An example system 100 may include a multicore processor 102 including a plurality of tiles 118, 130-144. Tiles 118, 130-144 may include respective caches 110, 150-164. Focusing on tile 118 for illustration, each tile 118 may include a cache 110, a processor or processor core (hereinafter referred to as "processor") 112 and/or a router 114. Each of the routers 114 may include a corresponding clock divider 116. Each of the clock dividers 116 may be configured to divide a clock of the corresponding router 114. Processor 112 may be adapted to process data. Cache 110 may be configured to store a data block local to processor 112. Multicore processor 102 may be arranged in communication with another multicore processor 103 so that data may be shared among a plurality of processors which, in some examples, may be on different dies.

As is described in more detail below, a clock assignment processor 166 may be configured in communication with tiles in multicore processor 102. Multicore processor 102 may be a processor core, a microcontroller, or a custom logic. Clock assignment processor 166 may further be configured in communication with a memory 168. Memory 168 may include a router frequency algorithm 170 and/or a packet routing algorithm 172 stored therein, which may be utilized by clock assignment processor 166 during operation. Algorithms 170, 172 may be stored in memory 168 such as by loading algorithms 170, 172 from another memory or storage. Clock assignment processor 166 may be configured to assign operating frequencies to routers in multicore processor 102 based on router frequency algorithm 170. The assigned frequencies for routers may be stored in memory 168. For example, a table comprising a listing of routers and their corresponding assigned frequencies may be stored in memory 168. After frequencies are assigned, clock assignment processor 166 may assign, direct or otherwise facilitate control of the movement of packets through routers in multicore processor 102 based on packet routing algorithm 172.

Figure 2:
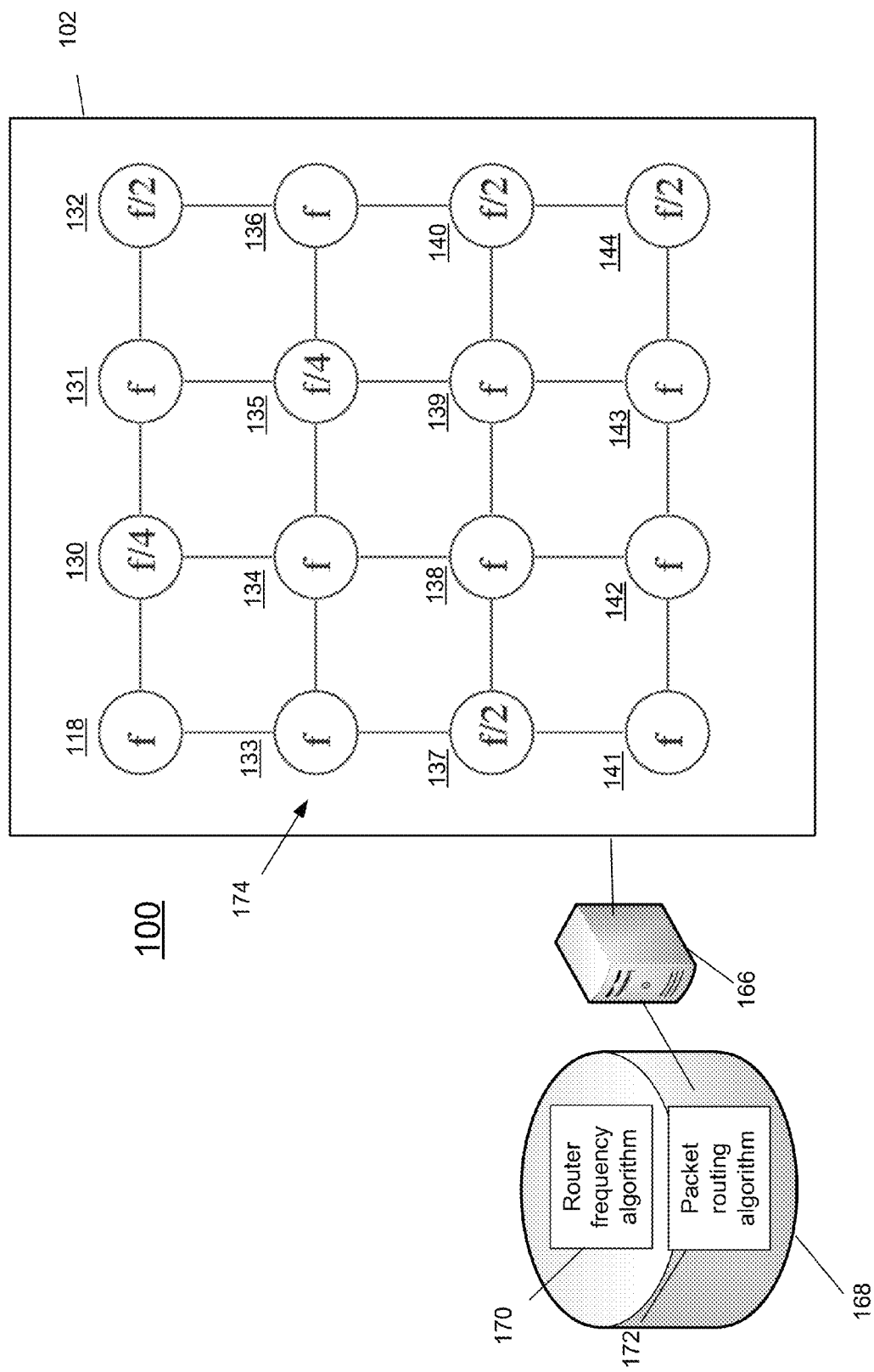
FIG. 2 illustrates an example system that can be utilized to implement heterogeneous router clock assignment and packet routing in a multicore architecture.

FIG. 2 illustrates an example system that can be utilized to implement heterogeneous router clock assignment and packet routing in a multicore architecture arranged in accordance with at least some embodiments described herein. FIG. 2 is substantially similar to system 100 of FIG. 1, with additional details. Those components in FIG. 2 that are labeled identically to components of FIG. 1 will not be described again for the purposes of clarity.

Routers in multicore processor 102 may be operable at different maximum operating frequencies. As shown in an example in FIG. 2, routers may be operable at different frequency steps, such as integer or non-integer multiples of a base frequency. In the example in FIG. 2, frequency steps f, f/2 and f/4 are shown. Routers in tiles 118, 131, 133, 134, 136, 138, 139, 141, 142, and 143 may be operable at a maximum frequency f. Routers in tiles 132, 137, 140, and 144 may be operable at a maximum frequency f/2. Routers in tiles 130 and 135 may be operable at a maximum frequency f/4. The frequency multiples shown are examples only and others may be used.

Clock assignment processor 166 may operate in accordance with router frequency algorithm 170 to identify assigned operating frequencies for groups of routers in multicore processor 102. The assigned operating frequencies for a group of routers may be less than or equal to the maximum operating frequency for at least one of the routers in a group.

Clock assignment processor 166 may be operable to generate a graph 174 representing a topology of cores in multicore processor 102. The topology may indicate routers and respective connections or communication paths between routers. Vertices in graph 174 may represent routers in multicore processor 102. A weight of each vertex may represent a maximum operating frequency of a respective router. For example, when multicore processor 102 is manufactured, routers may be tested to determine respective maximum operating frequencies for each of the routers. Edges in graph 174 may represent communication links or paths between routers.

Graph 174 may include sets V and E. Set V may correspond to the vertices or routers in the graph. Set E may correspond to edges or communication paths between routers. A weight or value w(v) may be assigned to each vertex v, where the weight may represent the maximum frequency of the router associated with vertex v. A frequency set F, may include available frequency steps of maximum operating frequencies in the routers. In the example illustrated in FIG. 2, set F has values designated as F={0, f/4, f/2, f}. Clock assignment processor 166 may identify frequency set F such as by receiving respective messages from routers in multicore processor 102. The messages may collectively identify the respective maximum frequencies of the corresponding routers.

Figure 3:
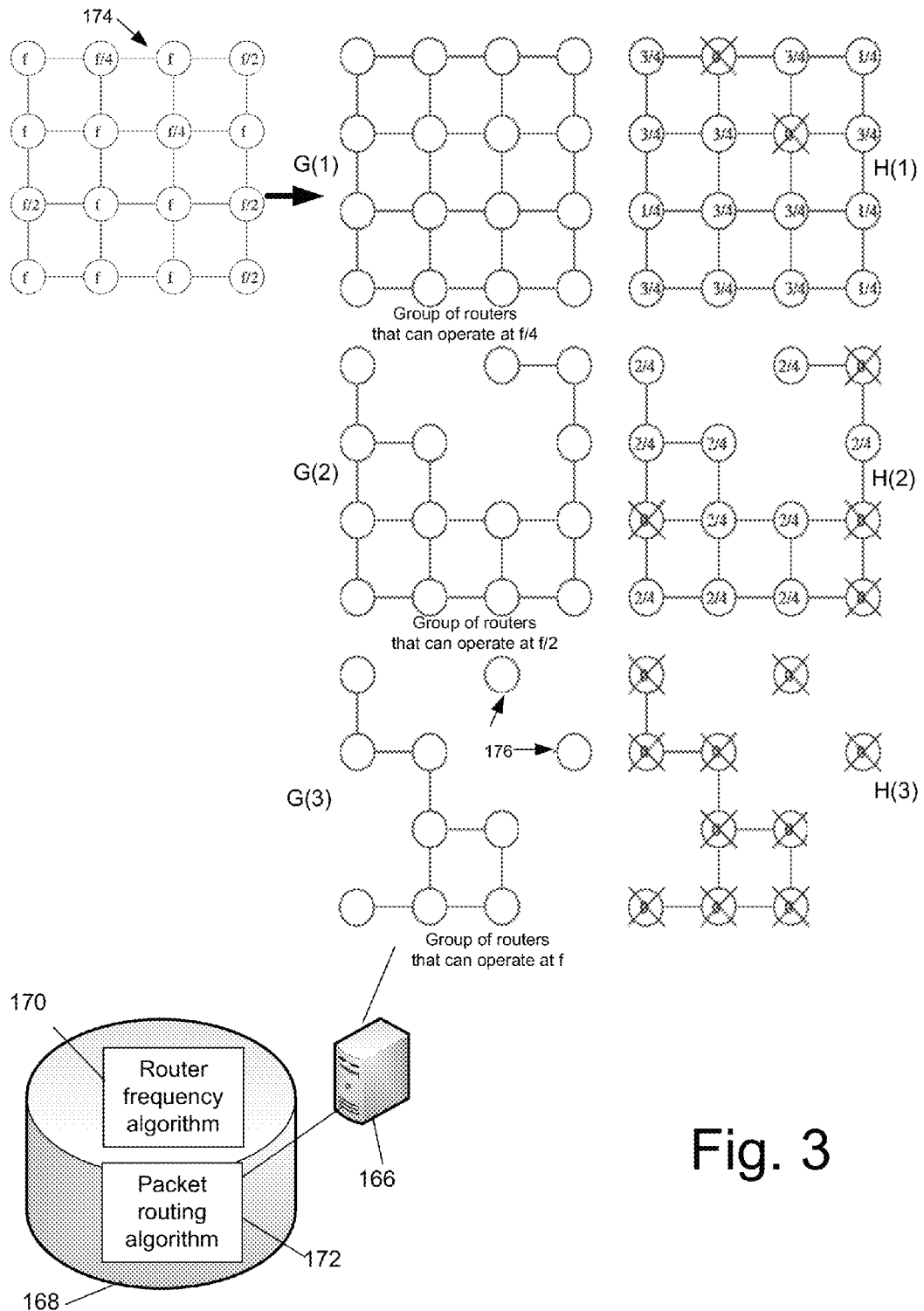
FIG. 3 illustrates an example system that can be utilized to implement heterogeneous router clock assignment and packet routing in a multicore architecture.

FIG. 3 illustrates an example system that can be utilized to implement heterogeneous router clock assignment and packet routing in a multicore architecture arranged in accordance with at least some embodiments described herein. FIG. 3 is substantially similar to system 100 of FIGS. 1 and 2, with additional details. Those components in FIG. 3 that are labeled identically to components of FIGS. 1 and 2 will not be described again for the purposes of clarity.

As explained in more detail below, router frequency algorithm 170 may be operable to divide graph 174 into two or more graphs corresponding to groups of nodes. Each group may identify routers that are capable of operation at an assigned operating frequency. By identifying groups of nodes capable of operating at the same frequency, a heterogeneous group of routers with different maximum operating frequencies from the original graph 174 may be divided into groups of homogenous routers with substantially the same operating frequencies. Routing algorithms using the groups of identified homogenous routers may then be used as is explained below. Further, a processor may identify isolated routers using the discussed algorithms. Such isolated routers may be capable of operating at a relatively higher frequency (e.g. f) but may be coupled to other nodes through routers that are capable at operating at lower frequencies (e.g. f/2). Such isolated routers may be controlled to have an assigned operating frequency at the relatively lower frequencies.

Clock assignment processor 166 may divide graph 174 into two or more graphs corresponding to groups of nodes. Clock assignment processor 166 may operate in accordance with router frequency algorithm 170 to identify a lowest maximum operating frequency $f_1$ in set F of graph 174. Clock assignment processor 166 may then subtract $f_1$ from the next highest frequency in set F to yield test frequency $f_d$. In the example in FIG. 3, the lowest maximum operating frequency in F is f/4 and so test frequency $f_d$ can be determined as $f_d$=f/4−0=f/4. Graph G(1) corresponds to a group of nodes that may operate at a frequency with a value of at least f/4. Graph H(1) illustrates graph 174 after the maximum operating frequency of the nodes has been reduced by test frequency $f_d$. In the example, two nodes now have a frequency identified as 0 in the algorithm and are removed (illustrated by the "X") from graph H(1), resulting in graph H(1) including fourteen vertices. Graphs G(1) and H(1) represent one iteration of router frequency algorithm 170.

Clock assignment processor 166 may then generate new graph G(2), which can be represented as G(2)=<$V_2$, $E_2$>, based on graph H(1), where set $V_2$ and set $E_2$ are initially assigned null sets. $V_2$ may be populated with vertices that are present in graph H(1). $E_2$ may be populated with edges in graph H(1) that connect two vertices of $V_2$. $V_2$ and $E_2$ represent a set of routers and edges or communication paths between routers in Graph G(2). Test frequency $f_d$ may remain as f/4. Graph H(2) may be initialized as a copy of graph H(1). For each vertex $v_i$ in graph H(2), the weight $w_i$ of the vertex is subtracted by the test frequency $f_d$. Vertices having a weight of zero are then removed from graph H(2). In the example, four vertices in graph H(2) have a weight of 0 and are removed (illustrated by the "X"), resulting in graph H(2) having ten vertices. Graph G(2) and H(2) represent the second iteration of router frequency algorithm 170. In graph G(2), the nodes may correspond to an operational frequency of f/2.

Clock assignment processor 166 may then generate new graph G(3), which can be represented as G(3)=<$V_3$, $E_3$>, based on graph H(2), where set $V_3$ and set $E_3$ are initially assigned null sets. $V_3$ may be populated with vertices that are present in graph H(2). $E_3$ may be populated with all edges in graph H(2) that connect two vertices of $V_3$. $V_3$ and $E_3$ represent a set of routers and edges or communication paths between routers in Graph G(3). Test frequency $f_d$ can now be designated as f/2. Graph H(3) may be initialized as a copy of graph H(2). For each vertex $v_i$ in graph H(3), the weight $w_i$ of the vertex may be subtracted by the test frequency $f_d$. Vertices having a weight of zero may then be removed from graph H(3). In the example, ten vertices in graph H(3) have a weight of 0 and are removed (illustrated by the "X"), resulting in zero vertices remaining in H(3). Graph G(3) and H(3) represent the third iteration of router frequency algorithm 170. At this iteration, the router frequency algorithm 170 may terminate because no more vertices remain in Graph H(3). Graph G(3) can represent three iterations of router frequency algorithm 170. In graph or group G(3), the nodes may operate at f.

FIG. 3 illustrates application of router frequency algorithm 170 to the example multicore processor in FIGS. 1 and 2 for three iterations of router frequency algorithm 170. Graph G(1) shows a subset of the original topology in graph 174 of routers in multicore processor 102. Graph G(2) shows graph 174 after two iterations of the above discussed router frequency algorithm. Graph G(3) shows graph 174 after three iterations of router frequency algorithm 170.

At each iteration of router frequency algorithm 170, clock assignment processor 166 may subtract out a test frequency $f_d$ at which routers can operate. In the first iteration, that test frequency $f_d$ may have an assigned frequency of f/4. Graph G(1) shows nodes with routers that are capable of operating at frequencies of at least f/4. In the example, graph G(1) illustrates that each of the routers in multicore processor 102 may be clustered into a group or sub-network on a chip (SNOC) with an assigned operating frequency of f/4. Graph G(1) illustrates a first homogeneous SNOC of the network in multicore processor 102.

Graph G(2) illustrates a second homogeneous sub-network on a chip of the original network in multicore processor 102. SNOC G(2) includes routers that may operate at a frequency of at least f/2.

Graph G(3) illustrates a third sub-network on a chip of the original network in multicore processor 102. Graph G(3) corresponds to a group that includes routers that may operate at a frequency of at least f. Graph G(3) also shows isolated nodes 176. In graph G(3), isolated nodes 176 are not coupled to any other nodes. In multicore processor 102, isolated nodes 176 may have maximum operating frequencies that are higher than the maximum operating frequencies of routers that they are coupled to. For example, referring again to FIG. 2, routers in tiles 131 and 136 may operate at a maximum frequency of f. Tiles 131 and 136 are coupled to tiles with routers that operate at lower maximum operating frequencies. Consequently, there may be no reason to operate routers in tiles 131 and 136 at frequency f because neighboring tiles may not be able to operate at the same, relatively high, frequency. Clock assignment processor 166 may thus control clock divider 116 (FIG. 1) in routers of tiles 131 and 136 to operate at the next lower frequency in set F. The next slower frequency in the example is f/2. For example, clock assignment processor 166 may control clock dividers 116 (FIG. 1) in routers of tiles 131 and 136 to adjust their assigned operating frequencies to a value of f/2. Reducing a maximum operating frequency of isolated nodes 176 may result in energy savings in operating multicore processor 102 because routers may be operated at slower frequencies.

FIG. 3 shows three SNOC topologies or groups G(1), G(2), G(3) that each may be used to support packet traffic at different operating frequencies. Nodes within an SNOC may each operate at the same frequency. Thus, several homogenous networks may be identified from a heterogeneous network of routers. As mentioned above, routers in SNOC 1 in group G(1) can all support traffic at an operating frequency of f/4; routers in SNOC 2 in group G(2) can support traffic at an operating frequency of f/2; and routers in SNOC 3 in group G(3) can support traffic at an operating frequency of f. In examples where data is to be sent from a source node to a destination node, one or more paths from the source node to the destination node may be identified, based on one or more of these SNOCs. SNOC G(1), G(2), and G(3) may be a logical partitioning of the network on chip to allow packet routing to be balanced against the traffic carrying capacity of different routers. SNOC G(1), G(2), and G(3) may be a physical partitioning of the network on chip where each SNOC may be assigned a complete virtual network where the virtual network has a separate set of virtual channels.

Figure 4:
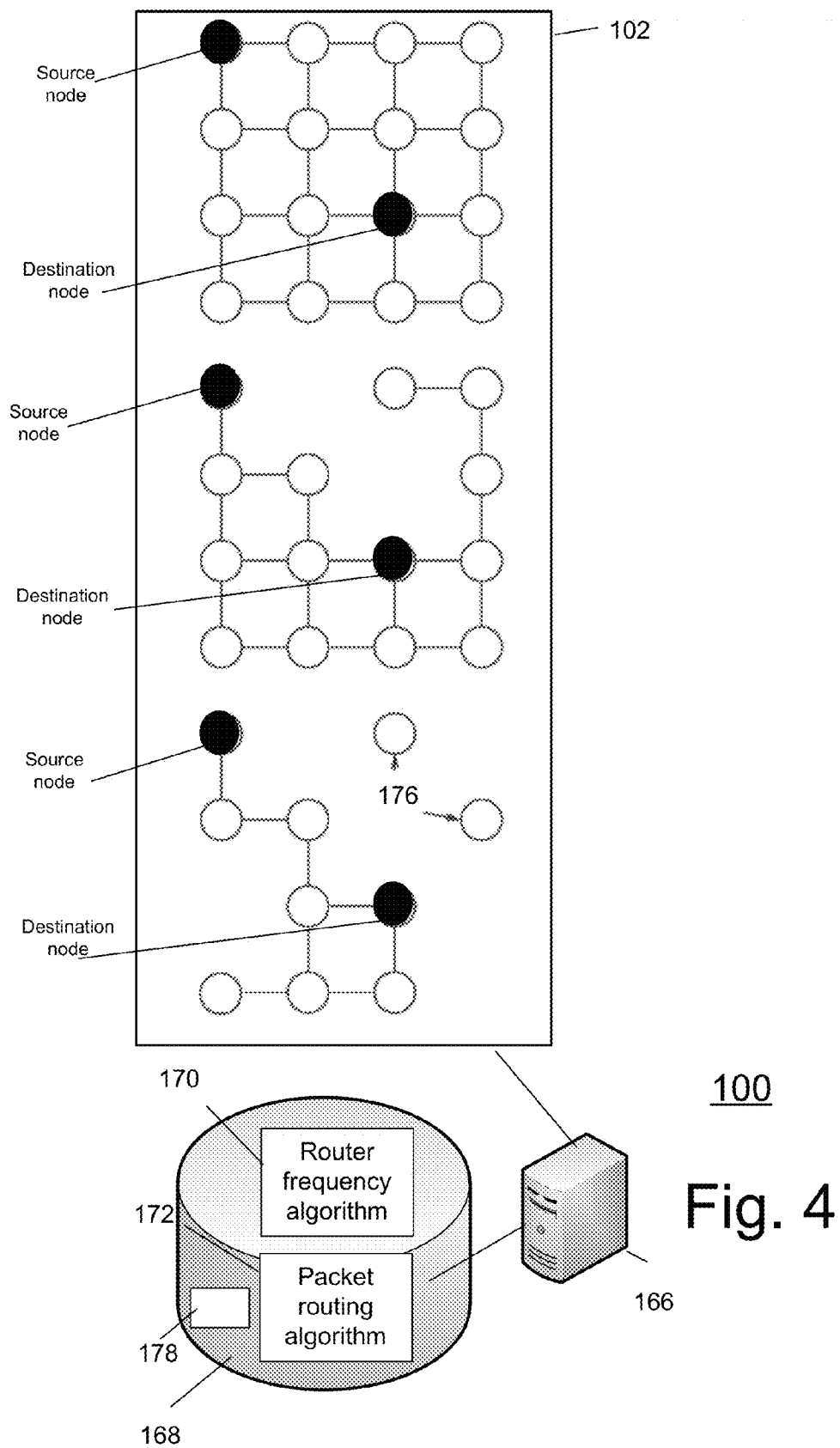
FIG. 4 illustrates an example system that can be utilized to implement heterogeneous router clock assignment and packet routing in a multicore architecture.

FIG. 4 illustrates an example system that can be utilized to implement heterogeneous router clock assignment and packet routing in a multicore architecture arranged in accordance with at least some embodiments described herein. FIG. 4 is substantially similar to system 100 of FIGS. 1, 2 and 3, with additional details. Those components in FIG. 4 that are labeled identically to components of FIGS. 1, 2 and 3 will not be described again for the purposes of clarity.

As discussed above, router frequency algorithm 170 may be utilized to identify sub-networks on a chip SNOCs. These SNOCs may be used by packet routing algorithm 172 to route packets from a source node to a destination node. Multiple SNOCs may enable packet routing algorithm 172 to identify multiple options in routing packets. For example, SNOC 3 in group G(3) may include routers that can support an operating frequency of f such that packets may be routed more quickly than using other SNOCs. However, group G(3) may include only a subset of nodes and may be more constrained regarding connectivity. A source or destination node may not be in SNOC 3 and/or more hops may be required if SNOC 3 is used. As multiple SNOCs are identified, a routing path for packets may be generated by packet routing algorithm 172. Packet routing algorithm 172 may be implemented by clock assignment processor 166 and/or by one or more routers in multicore processor 102. For example, routers in multicore processor 102 may each have access to a topology of the network in multicore processor 102 and may implement packet routing algorithm 172 using the topology. The topology may include information about the SNOCs.

In the example shown in FIG. 4, multiple paths may be identified by packet routing algorithm 172 as candidate paths to move a packet from a source node to a destination node. Packet routing algorithm 172 may choose randomly a path from one of the SNOC1, SNOC2, or SNOC3, weighted by the assigned frequency for each SNOC. For example, if a packet can be sent on SNOC1, SNOC2, or SNOC3, the packet may be sent through a path in SNOC1 with 25% probability, a path in SNOC2 with 25% probability, or a path in SNOC3 with 50% probability. As another example, if a packet can be sent only through SNOC1 or SNOC2 (but SNOC3 cannot provide a path), then the packet may be sent through a path in SNOC1 with 50% probability and through a path in SNOC2 with a 50% probability.

In another example, packet routing algorithm 172 may define a cost function C to evaluate a cost when selecting a particular path from the candidate paths. Cost function C may be expressed as $C(R(s,d), L)$ where s is the source node, d is the destination node, L is the SNOC level or number and $R(s,d)$ may represent the path being considered for its cost. The cost function may be defined based on a desired routing policy goal. For example, the cost function may be defined for a lowest delay, a lowest energy consumption, a lowest energy-delay product, etc. Packet routing algorithm 172 may be utilized to determine the cost for possible routes for routing packets for each SNOC. Packet routing algorithm 172 may select one of the routes with the lowest cost. In situations where two or more paths have the same cost, packet routing algorithm may randomly select one path or may select a path with a lower cost or select a path based on other policy goals.

For example, the cost function may be based on a number of network hops in a route. Such a cost function may work particularly well in a homogenous system where one hop is generally equivalent to another hop. Another example of a cost function may be based on a weight assigned to different SNOCs. For example, SNOCs running at higher frequencies may be weighed higher than SNOCs running at lower frequencies.

Another example of a cost function may be based on a measured time to send a packet along the particular route. Latencies between nodes may be periodically measured and placed in a routing table 178 in memory 168, where the routing table 178 may be used by packet routing algorithm 172. For example, when a message is sent from a source node to a destination node, the message may be appended with a time stamp. The time stamp may indicate when the message was sent from the source node. When the message is received by the destination node, the time stamp may be subtracted from the time of receipt at the destination node to determine a time delta. The time delta may be divided by the number of hops traversed by the message to arrive at an average latency per hop. A destination node may report the average latency per hop to the source node.

In the example shown, focusing on SNOC 1 in group G(1), many communications paths are available from a source node to a destination node. However, as SNOC 1 is being used, routers may operate at the slowest frequency f/4. If SNOC 2 is chosen, less paths are available between the source node and destination node but the routers may operate at f/2. If SNOC 3 is chosen, one path is shown in the example but the routers may operate at frequency f.

The source node may store the average latency per hop information in routing table 178 in association with the destination node and the appropriate SNOC level. Average routing times per hop for each SNOC may thus be recorded in routing table 178. Thereafter, clock assignment processor 166, based on packet routing algorithm 172, may analyze routing table 178. Clock assignment processor 166, based on packet routing algorithm 172, may generate a cost for each path based on a latency per hop for each SNOC, multiplied by the number of hops. Clock assignment processor 166 may assign packets to the path with the lowest cost. Clock assignment processor 166 may also assign some packets to a path that does not have the lowest cost to balance and maintain latencies.

Among other possible benefits, a system configured in accordance with the present disclosure may facilitate use of a network on a chip (NoC) where routers may be operated at less than their maximum operating frequencies. Energy saved by operating routers at lower frequencies may allow other parts of the die to have an additional power budget to boost computational performance. Applications that do not need high performance routers need not necessarily run routers at high frequencies. A system in accordance with the disclosure can identify routers that can be operated at lower frequencies without sacrificing performance. A heterogeneous network on a chip may be viewed as a collection of homogenous sub-networks on a chip allowing for a routing policy that may identify energy savings opportunities. Energy efficiency on a chip may be improved. As routers may use a significant portion of the power on a die, realizing energy savings for the routers may result in significant energy savings for the die.

Figure 5:
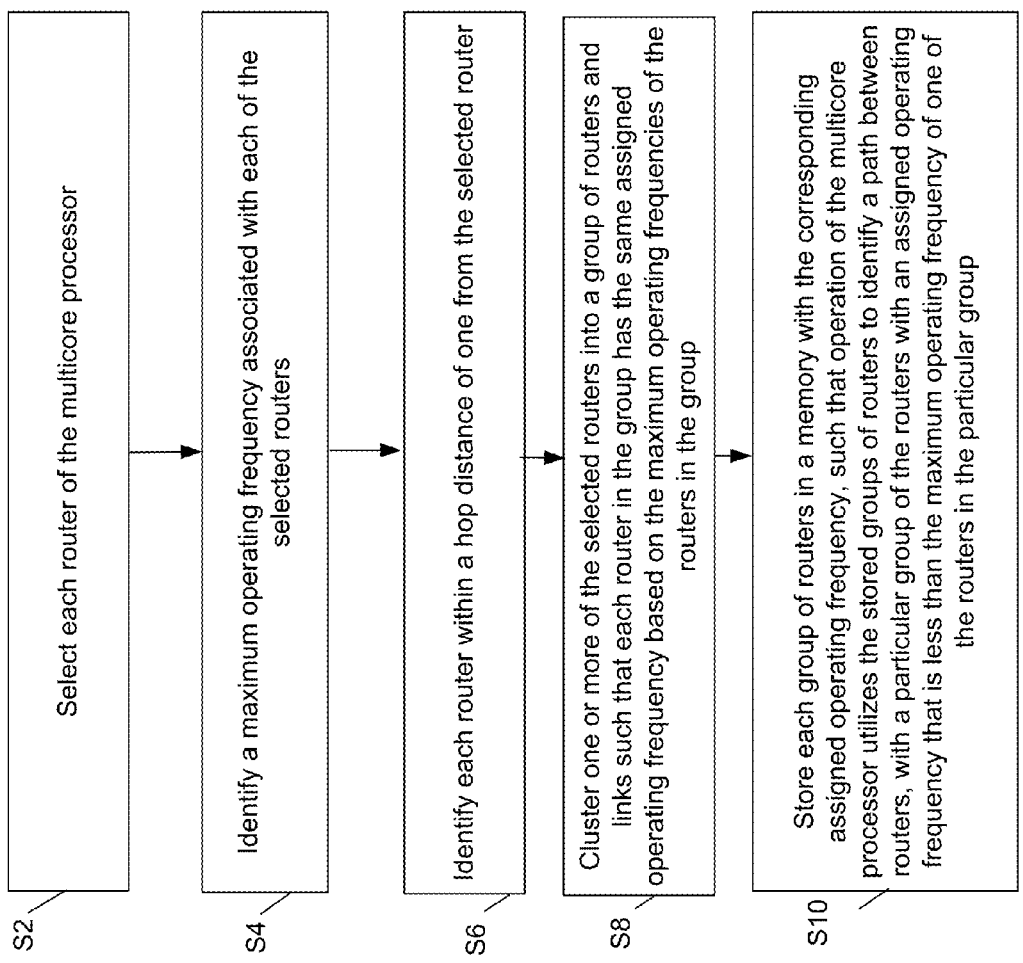
FIG. 5 depicts a flow diagram for an example process for implementing heterogeneous router clock assignment and packet routing in a multicore architecture.

FIG. 5 depicts a flow diagram for an example process for implementing heterogeneous router clock assignment and packet routing in a multicore architecture arranged in accordance with at least some embodiments described herein. In some examples, the process in FIG. 5 could be implemented using system 100 discussed above and may be used for identifying groups of routers among tiles in a multicore processor.

An example process may include one or more operations, actions, or functions as illustrated by one or more of blocks S2, S4, S6, S8 and/or S10. Although illustrated as discrete blocks, various blocks may be divided into additional blocks, combined into fewer blocks, or eliminated, depending on the desired implementation.

Processing may begin at block S2, "Select each router of the multicore processor." At block S2, a clock assignment processor that is configured in communication with a multicore processor may be operable to select each router of the multicore processor. The selecting may include building a graph of nodes, where each node corresponds to a router in the multicore processor.

Processing may continue from block S2 to block S4, "Identify a maximum operating frequency associated with each of the selected routers." At block S4, the clock assignment processor may access a topology graph of the routers, analyze the graph, and identify a maximum operating frequency associated with each of the selected routers. In some examples, the routers may operate at two more multiples of a base operating frequency.

Processing may continue from block S4 to block S6, "Identify each router within a hop distance of one from the selected router". At block S6, the clock assignment processor may, for each selected router, identify each router within a one hop distance from the selected router.

Processing may continue from block S6 to block S8, "Cluster one or more of the selected routers into a group of routers and links such that each router in the group has the same assigned operating frequency based on the maximum operating frequencies of the routers in the group." At block S8, the clock assignment processor may cluster each router into a group, where some groups may include multiple routers while others may have a single router. Each router in the group may have the same assigned operating frequency based on the maximum operating frequencies of the routers represented in the group. The clock assignment processor may cluster routers into a group such that each router in the group has the same assigned operating frequency. In an example, the operating frequency of each router in the group is evaluated, the slowest operating frequency among the routers is identified, and each router in the group may be assigned the operating frequency of the slowest router in the group. In some examples, groups may have assigned operating frequencies that are integer multiples of one another. In other examples, the assigned operating frequencies may be non-integer multiples of one another.

Processing may continue from block S8 to block S10, "Store each group of routers in a memory with the corresponding assigned operating frequency, such that operation of the multicore processor utilizes the stored groups of routers to identify a path between routers, with a particular group of the routers with an assigned operating frequency that is less than the maximum operating frequency of one of routers in the particular group." At block S10, the clock assignment processor may store each group of routers with the corresponding assigned operating frequencies in a memory. One of the groups of routers may have an operating frequency that is less than the maximum operating frequency of one of the routers in the particular group.

Operation of the multicore processor may utilize the stored groups or subnetworks of routers to identify paths between routers. For example, the clock assignment processor may determine costs to send data from a first router to a second router using one or more of the groups or subnetworks. Evaluation of the path may be based on delay, energy consumption, number of network hops, energy-delay product, or a time for a packet to travel from the first router to the second router. Based on the determined costs, the clock assignment processor may select a path to send the data between the routers.

Figure 6:
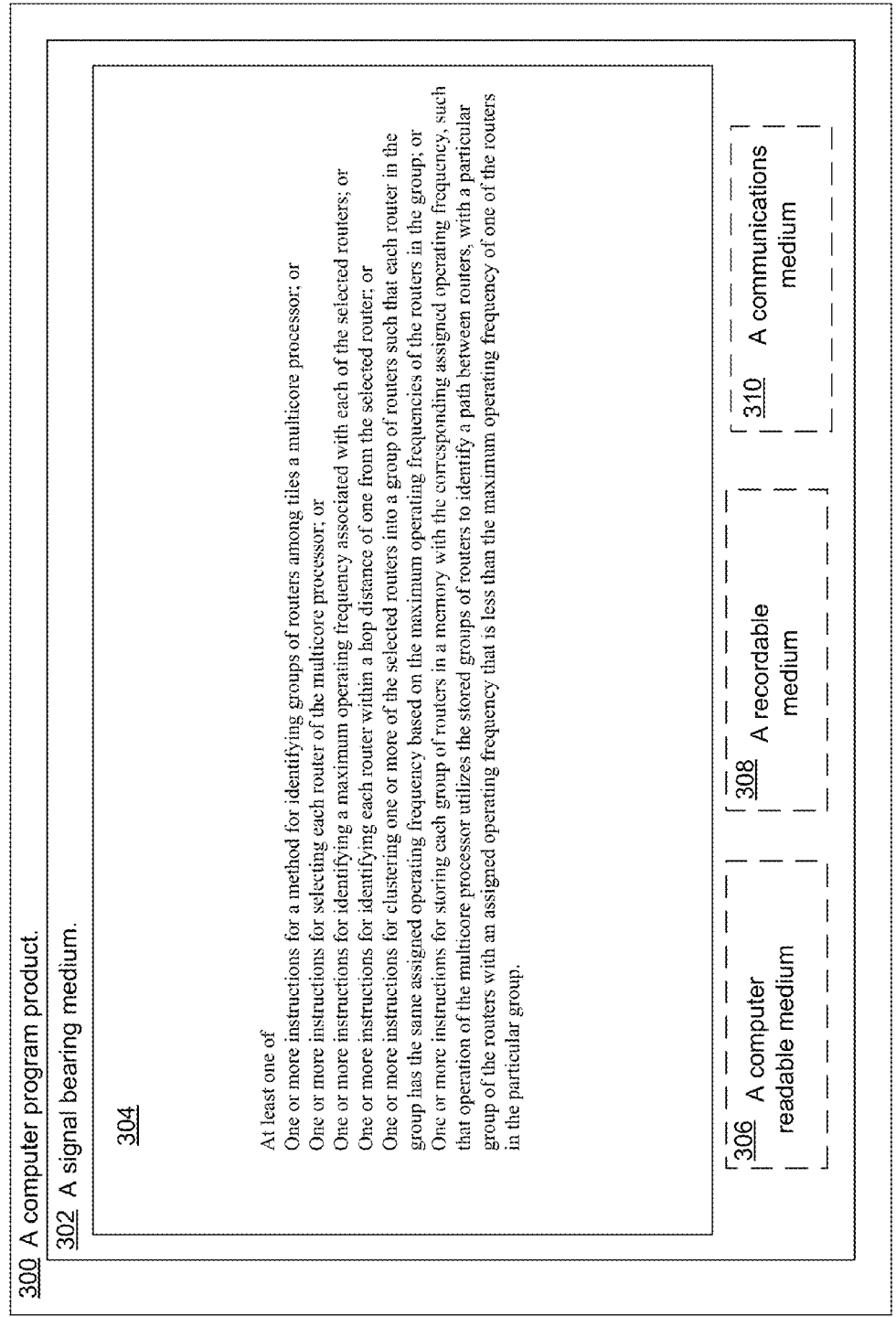
FIG. 6 illustrates a computer program product that can be utilized to implement heterogeneous router clock assignment and packet routing in a multicore architecture.

FIG. 6 illustrates an example computer program product 300 that can be utilized to implement heterogeneous router clock assignment and packet routing in a multicore architecture arranged in accordance with at least some embodiments described herein. Computer program product 300 may include a signal bearing medium 302. Signal bearing medium 302 may include one or more instructions 304 that, when executed by, for example, a processor, may provide the functionality described above with respect to FIGS. 1-5. Thus, for example, referring to system 100, clock assignment processor 166 may undertake one or more of the blocks shown in FIG. 6 in response to instructions 304 conveyed to the system 100 by signal bearing medium 302.

In some implementations, signal bearing medium 302 may encompass a computer-readable medium 306, such as, but not limited to, a hard disk drive, a Compact Disc (CD), a Digital Video Disk (DVD), a digital tape, memory, etc. In some implementations, signal bearing medium 302 may encompass a recordable medium 308, such as, but not limited to, memory, read/write (R/W) CDs, R/W DVDs, etc. In some implementations, signal bearing medium 302 may encompass a communications medium 310, such as, but not limited to, a digital and/or an analog communication medium (e.g., a fiber optic cable, a waveguide, a wired communications link, a wireless communication link, etc.). Thus, for example, computer program product 300 may be conveyed to one or more modules of the system 100 by an RF signal bearing medium 302, where the signal bearing medium 302 is conveyed by a wireless communications medium 310 (e.g., a wireless communications medium conforming with the IEEE 802.11 standard).

FIG. 7 is a block diagram illustrating an example computing device 400 that is arranged to implement heterogeneous router clock assignment and packet routing in a multicore architecture arranged in accordance with at least some embodiments described herein. In a very basic configuration 402, computing device 400 typically includes one or more processors 404 and a system memory 406. A memory bus 408 may be used for communicating between processor 404 and system memory 406.

Depending on the desired configuration, processor 404 may be of any type including but not limited to a microprocessor (IP), a microcontroller (µC), a digital signal processor (DSP), or any combination thereof. Processor 404 may include one more levels of caching, such as a level one cache 410 and a level two cache 412, a processor core 414, and registers 416. An example processor core 414 may include an arithmetic logic unit (ALU), a floating point unit (FPU), a digital signal processing core (DSP Core), or any combination thereof. An example memory controller 418 may also be used with processor 404, or in some implementations memory controller 418 may be an internal part of processor 404.

Depending on the desired configuration, system memory 406 may be of any type including but not limited to volatile memory (such as RAM), non-volatile memory (such as ROM, flash memory, etc.) or any combination thereof. System memory 406 may include an operating system 420, one or more applications 422, and program data 424. Application 422 may include a router clock assignment algorithm 426 that is arranged to perform the functions as described herein including those described with respect to system 100 of FIG. 1. Program data 424 may include router clock assignment data 428 that may be useful to implement heterogeneous router clock assignment and packet routing as is described herein. In some embodiments, application 422 may be arranged to operate with program data 424 on operating system 420 such that heterogeneous router clock assignment and packet routing may be provided. This described basic configuration 402 is illustrated in FIG. 7 by those components within the inner dashed line.

Computing device 400 may have additional features or functionality, and additional interfaces to facilitate communications between basic configuration 402 and any required devices and interfaces. For example, a bus/interface controller 430 may be used to facilitate communications between basic configuration 402 and one or more data storage devices 432 via a storage interface bus 434. Data storage devices 432 may be removable storage devices 436, non-removable storage devices 438, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 406, removable storage devices 436 and non-removable storage devices 438 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 400. Any such computer storage media may be part of computing device 400.

Computing device 400 may also include an interface bus 440 for facilitating communication from various interface devices (e.g., output devices 442, peripheral interfaces 444, and communication devices 446) to basic configuration 402 via bus/interface controller 430. Example output devices 442 include a graphics processing unit 448 and an audio processing unit 450, which may be configured to communicate to various external devices such as a display or speakers via one or more A/V ports 452. Example peripheral interfaces 444 include a serial interface controller 454 or a parallel interface controller 456, which may be configured to communicate with external devices such as input devices (e.g., keyboard, mouse, pen, voice input device, touch input device, etc.) or other peripheral devices (e.g., printer, scanner, etc.) via one or more I/O ports 458. An example communication device 446 includes a network controller 460, which may be arranged to facilitate communications with one or more other computing devices 462 over a network communication link via one or more communication ports 464.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 400 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 400 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method to identify groups of routers among tiles in a multicore processor, the method comprising:
   selecting, by a processor, each router of the multicore processor, wherein the processor is different from the multicore processor, and each selected router is inside of a respective tile of the multicore processor;
   identifying, by the processor, a maximum operating frequency associated with each of the selected routers;
   identifying, by the processor, one or more routers within a hop distance of one from each selected router;
   clustering, by the processor, one or more of the selected routers into a group of routers such that the group of routers has a same assigned operating frequency, wherein the clustering is based on the maximum operating frequencies of the routers in the group; and
   storing, by the processor, the group of routers and the assigned operating frequency in a memory, such that operation of the multicore processor utilizes one or more groups of routers and corresponding operating frequencies stored in the memory to identify a path between routers, wherein one group of routers among the one or more groups of routers stored in the memory is assigned to a particular operating frequency less than the maximum operating frequency of one of the routers in the one group.

2. The method of claim 1, wherein clustering one or more of the selected routers further comprises determining the assigned operating frequency for the group of routers based on the maximum operating frequency of a slowest one of the routers in the group of routers.

3. The method of claim 1, wherein the group of routers is a first group of routers, and clustering one or more of the selected routers into the group of routers comprises determining the assigned operating frequency associated with the first group of routers as a multiple of an operating frequency associated with a second group of routers.

4. The method of claim 1, further comprising:
   determining, using the groups of routers and corresponding operating frequencies stored in the memory, respective costs to send data from a first router to a second router, along one or more routes between the first router and the second router; and
   based on the determined respective costs, selecting a path between the first router and the second router to send a packet from the first router to the second router, wherein selection of the path comprises identification of one or more routers from one of the groups of routers stored in the memory, and selection of an operating frequency assigned to the one of the groups of router as the operating frequency for the path.

5. The method of claim 4, wherein selecting the path further comprises:
   identifying the assigned operating frequency based on a respective operating frequency for one of the first router, the second router, or an intermediate router between the first and second router.

6. The method of claim 4, wherein determining respective costs further comprises:
   evaluating the one or more paths between the first router and the second router, based on one or more of delay, energy consumption, number of network hops, energy-delay product, or a time for a packet to travel from the first router to the second router.

7. The method of claim 1, wherein selecting each router further comprises:
building a graph of nodes, wherein each node in the graph corresponds to a router of the multicore processor.

8. The method of claim 1, further comprising:
assigning respective weights to respective paths between a first router and a second router based on the assigned operating frequency for the respective paths; and
selecting one of the paths, based on the respective weights, to send a packet from the first router to the second router.

9. A method to identify groups of routers among tiles in a multicore processor, the method comprising:
building, by a processor, a graph of nodes, wherein each node in the graph corresponds to a router in the multicore processor, wherein the processor is different from the multicore processor;
selecting, by the processor, each node in the graph;
identifying, by the processor, a maximum operating frequency associated with each selected node;
identifying, by the processor, one or more nodes within a hop distance of one from each selected node;
clustering, by the processor, one or more of the nodes into a group of nodes such that the group nodes has a same assigned operating frequency, wherein the clustering is based on the maximum operating frequencies of the routers in the group; and
storing, by the processor, the group of nodes and the assigned operating frequency in a memory, such that operation of the multicore processor utilizes groups of nodes and corresponding operating frequencies stored in the memory to identify a path between routers, wherein one group of nodes with an assigned operating frequency that is less than the maximum operating frequency of one of the nodes in the one group.

10. The method of claim 9, wherein clustering further comprises:
identifying one of the nodes in the group of nodes that has the maximum operating frequency less than the assigned operating frequency; and
removing the identified node from the group of nodes.

11. The method of claim 9, wherein clustering further comprises:
iteratively evaluating the maximum operating frequencies of each of the nodes in a trial group of nodes according to a trial operating frequency;
removing, from the trial group, one or more of the nodes that have the corresponding maximum operating frequency less than the trial operating frequency; and
after iteratively evaluating and removing, designating the trial operating frequency as the assigned operating frequency, and designating the trial group as the group of nodes.

12. The method of claim 9, wherein clustering one or more of the selected nodes further comprises determining the assigned operating frequency for the corresponding group of nodes based on the maximum operating frequency of a slowest one of the routers in the group of routers.

13. The method of claim 9, wherein the group of nodes is a first group of nodes, and the assigned operating frequency associated with the first group of nodes is a multiple of an assigned operating frequency associated with a second group of nodes.

14. The method of claim 9, further comprising:
determining, using the groups of nodes and corresponding operating frequencies stored in the memory, respective costs to send data from a first router to a second router, along one or more paths between the first router and the second router; and
based on the determined respective costs, selecting a path between the first router and the second router to send a packet from the first router to the second router, wherein the selected path corresponds to one of the assigned operating frequencies.

15. The method of claim 14, wherein selecting the path further comprises:
identifying the assigned operating frequency based on a respective operating frequency for one of the first router, the second router, or an intermediate router between the first and second router.

16. The method of claim 15, wherein determining respective costs further comprises:
evaluating the one or more routes, based on one or more of delay, energy consumption, number of network hops, energy-delay product, or a time for a packet to travel from the first router to the second router.

17. A system effective to control an operating frequency of routers in a multicore processor, the system comprising:
a multicore processor, wherein the multicore processor includes two or more tiles, each tile includes at least one router, at least a first router having a maximum operating frequency different from a second router;
a memory;
a processor configured to be in communication with the multicore processor and the memory, the processor effective to:
select each router of the multicore processor;
identify the maximum operating frequency associated with each of the selected routers;
identify one or more routers within a hop distance of one from each selected router;
cluster one or more of the routers into a group of routers such that the group of routers has a same assigned operating frequency, wherein the cluster is based on the maximum operating frequencies of the routers in the group; and
store the group of routers and the assigned operating frequency in the memory, such that operation of the multicore processor utilizes one or more groups of routers and corresponding operating frequencies stored in the memory to identify paths between routers, wherein one group of routers among the one or more groups of routers is assigned to a particular operating frequency that is less than the maximum operating frequency of one of the routers in the one group.

18. The system of claim 17, wherein the processor is further configured to determine the assigned operating frequency for the corresponding group of routers based on the maximum operating frequency of a slowest one of the routers in the group of routers.

19. The system of claim 17, wherein the processor is further configured to:
determine, with use of the groups of routers stored in the memory, respective costs to send data from a first router to a second router, along one or more routes between the first router and the second router; and
based on the determined respective costs, select the path between the first router and the second router to send a packet from the first router to the second router, wherein selection includes identification of one or more routers from one of the groups of routers stored in the memory, and selection of an operating frequency assigned to the one of the groups of routers as the operating frequency for the path.

20. The system of claim 17, wherein the processor is further configured to:
   determine, with use of the groups of routers, respective costs to send data from a first router to a second router, along one or more paths between the first router and the second router; and
   select a path between the first router and the second router to send a packet from the first router to the second router, based on a respective operating frequency for one of the first router, the second router, or an intermediate router between the first and second router and based on the determined respective costs, wherein the selected path corresponds to one of the assigned operating frequencies.

21. The system of claim 20, wherein the processor is configured to:
   evaluate the one or more paths between the first router and the second router, based on one or more of delay, energy consumption, number of network hops, energy-delay product, or a time for a packet to travel from the first router to the second router.

22. A method to select a path between a first router and a second router, the method comprising:
   identifying, by a processor, one or more groups of routers stored in a memory, wherein each router has a respective maximum operating frequency, each group of routers has a same assigned operating frequency, the assigned operating frequency of each group of routers is stored in the memory, and one group of routers among the one or more groups of routers has assigned operating frequency that is less than the maximum operating frequency of one of the routers in the one group;
   determining, by the processor, using the groups of routers, respective costs to send data from a first router to a second router, along one or more paths between the first router and the second router; and
   based on the determined respective costs, selecting, by the processor, a path between the first router and the second router to send a packet from the first router to the second router, wherein selection of the path includes identification of one or more routers from one of the groups of routers, and selection of an operating frequency assigned to the one of the groups of routers as the operating frequency for the path.

* * * * *